March 3, 1942.   P. BOURQUE   2,275,168
ELECTRODE HOLDER
Filed Oct. 21, 1940
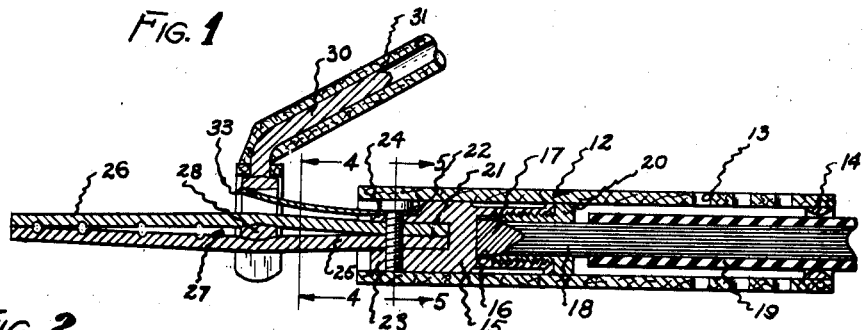
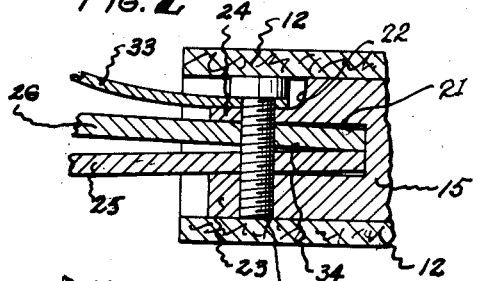
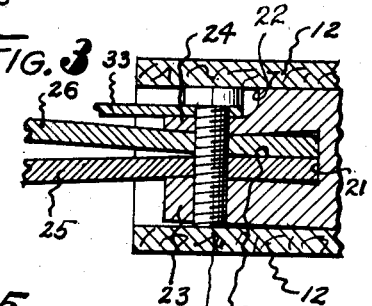
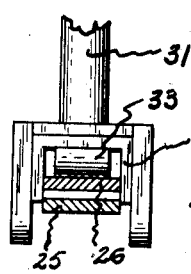
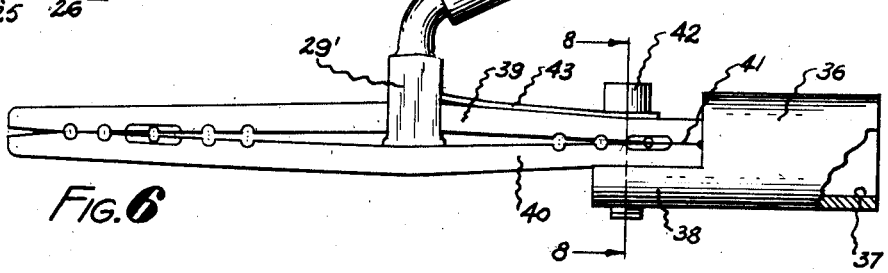
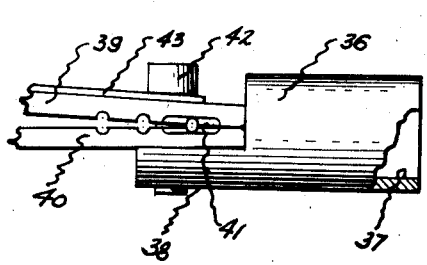
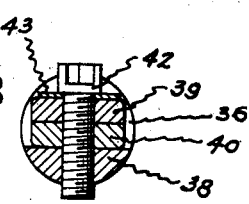
INVENTOR.
PHILIP BOURQUE
BY
ATTORNEY Patented Mar. 3, 1942

2,275,168

UNITED STATES PATENT OFFICE 2,275,168

ELECTRODE HOLDER

Philip Bourque, Detroit, Mich., assignor to Bordon Mfg. Co., Inc., Detroit, Mich., a corporation of Michigan Application October 21, 1940, Serial No. 362,142

10 Claims. (Cl. 219—8)

My invention relates to a new and useful improvement in an electrode holder in which a pair of cooperating jaws is adapted for clamping an electrode wire therebetween.

In the present type of electrode holder I provide a pair of clamping jaws at least one of which is formed from resilient material, although if desired, both jaws may be formed of resilient material. In this construction the jaws are separate pieces and project outwardly from a shank to which the electric conductor which is generally a cable is attached. In the use of such electrodes the jaws become worn or burned away at their outer ends so that the structure is no longer usable. In some types of construction these jaws and the shank-forming portion are formed integral so that when the jaws are discarded as being no longer usable, the shank portion must also be discarded.

An object of the present invention is to provide an electrode holder of the class described so arranged that the jaws may be separately attached to the shank so that they may be replaced without requiring the necessity of replacing the shank portion.

Another object of the invention is the provision of a shank having a pair of spaced tongues between which the butt ends of the jaws may be positioned for clamping therebetween, these tongues being formed from springable material so that they may be moved into approach toward each other for securely clamping the butt ends of the jaws therein. In this type of construction the jaws overlie each other in registering relation and it is an object of the present invention to provide a shank having a portion for receiving the butt ends of the jaws and adapted for maintaining the jaws in alignment.

Another object of the invention is the provision of an electrode holder of this class having a pair of superimposed, registering jaws normally diverging relatively to each other from their opposite ends and secured at one of their ends to a shank-forming portion in such a manner that the divergency is reduced and the tension of the engagement of the jaws with each other is increased through the resiliency of at least one of the jaws.

Another object of the present invention is the provision of an electrode holder of this class having a shank forming portion provided with a pair of spaced tongues between which the butt end of the pair of superimposed registering jaws may be positioned and whereby the tension of the jaws bearing against each other may be adjusted by movement of these tongues toward or away from each other.

Another object of the invention is the provision of an electrode holder of this class having a shank forming portion having a tongue projecting outwardly therefrom and provided with means for securing the diverging ends of a pair of jaws thereto in such a manner that the degree of divergence may have variance for regulating the tension of the jaws with each other.

Other objects will appear hereinafter.

It is recognized that various changes and modifications may be made in the detail of structure illustrated and it is intended that such variations shall be embraced within the scope of the claims forming a part hereof.

Forming a part of the specification is a drawing in which:

Fig. 1 is a longitudinal, central, vertical, sectional view of the invention with a part broken away.

Fig. 2 is an enlarged fragmentary, central, longitudinal, vertical, sectional view showing the jaws in one position.

Fig. 3 is a view similar to Fig. 2 showing the jaws in a position of greater tension.

Fig. 4 is a sectional view taken on line 4—4 of Fig. 1

Fig. 5 is a sectional view taken on line 5—5 of Fig. 1.

Fig. 6 is a side elevational view of a slightly modified form of the invention with parts broken away and a part shown in section.

Fig. 7 is a fragmentary side elevational view of a modified form of the invention with parts broken away and a part shown in section.

Fig. 8 is a sectional view taken on line 8—8 of Fig. 6.

In the drawing I have illustrated the electrode holder provided with a handle 12 formed preferably from fibre or other suitable heat-insulating material. This handle is provided with a plurality of vertical openings 13 and at its rear or butt end it is provided with an inset ring 14. The handle is adapted to embrace a shank 15 which is provided with an internally threaded socket 16 in which is positioned a spreader point 17. The bared end 18 of the cable or electric conductor 19 which extends through the ring 14 is inserted in the socket 16 in engagement with the spreader point 17. A jam nut 20 is threaded into the socket for forcing the bared end of the cable into intimate contact with the point 17. The forward end of the shank is provided with a slot 21 extending inwardly from the end thereof to provide a pair of spaced apart tongues 23 and 24, the tongue 24 being cut away as at 22.

The clamping portion of the electrode holder comprises a pair of jaws 25 and 26 made from flat plate-like material, preferably of resilient nature. It is not necessary that both of the jaws be resilient but it is necessary that one of them be springable in order that the desired clamping may be obtained. These jaws are mounted in superimposed registering relation with the butt ends thereof inserted in the slot 21 so that the ends of the jaws engage the bottom of the slot. In Fig. 2 the jaws are illustrated in their normal position before being subjected to a pressing or squeezing strain. As is obvious from Fig. 1 and Fig. 2, these jaws, when placed in superimposed, registering relation, diverge from each other at their opposite ends so that the jaws may properly be described as being slightly bow shaped. Each of the jaws is provided with an opening through which the bolt 48 may be projected, this bolt being projected through the tongue 24 and threaded into the tongue 23. The tongues 22 and 23 are springable so that they may be sprung toward each other through the pressure of the bolt 48 and so that they will spring apart when the pressure of the bolt 48 is released.

Some mechanism is necessary for springing the jaws apart at their free ends so that an electrode wire may be placed therebetween and in the drawing I have illustrated a particular type of mechanism for effecting this springing apart although other well-known types of mechanisms for springing jaws apart may be resorted to with equal effect. Because of the bow shaped construction of the jaws there is a space 27 between them and extending through this space is a lower portion 28 of a loop 29 projecting from the upper side of which is a stem 30 on which is mounted a tube 31 of suitable insulating material which serves as an extension of the stem to provide an operating handle or trigger. The member 28 serves as a cam or lever for springing the jaws apart at their free ends. Secured by the bolt 48 is a spring 33 through which this bolt projects, one end of the spring being flared upwardly to engage the upper portion of the loop 29 and prevent undue rattling.

When the jaws are placed in position as shown in Fig. 2 and the bolt 48 is projected therethrough a disalignment of the jaws relatively to each other is prevented through the engagement of their ends with the bottom of the slot 21 and by the bolt 48. By flattening out the opposed bows formed by the jaws or reducing the degree of divergence between the butt ends of the jaws, the tension of engagement of the forward ends of the jaws with each other is increased. After assembly as shown in Fig. 2 the bolt 48 is threaded so as to draw the clamping tongues 23 and 24 into tightly clamping relation with the butt ends of the jaws 25 and 26. This serves to impart to the jaws the desired tension of contact at their free ends and render them efficient for clamping an electrode wire or other material placed therebetween.

In Fig. 3 the slight flexing or springing of the tongues 23 and 24 is illustrated as well as the reduction of the divergence of the ends of the jaws. When the jaws have been assembled as shown in Fig. 1 and the proper tension imparted thereto, by reducing the divergence as illustrated in Fig. 3, a tight clamping adjacent the free ends of the jaws is effected. A rocking of the member 28 will serve to spread these jaws apart so that wire or other material to be clamped may be inserted between the jaws. In the rocking of the member 28 the resilient jaw or both of the jaws if they are resilient will spring so that the separation desired may be accomplished.

This construction is one whereby the jaws may be firmly held in connection with the shank and prevented from moving out of alignment. It will be noted that the tongues 23 and 24 extend forwardly of the openings formed in the jaws 25 and 26 through which the bolt 48 projects. Consequently, when the jaws are sprung apart at their forward ends they flex along a line or a portion forwardly of the bolt opening which is formed in these jaws. Experience has shown that this arrangement prevents a cracking of the jaws after repeated flexing should the line of flex be through or closely adjacent to the bolt receiving opening.

It is to be noted that no spacer plate is positioned between the butt ends of the jaws, the jaws engaging at their butt ends and being brought into a more extensive engagement upon a flexing or springing together of the clamping tongues. In this way there is no strictly rigid connection as all of the parts are possessed of a certain amount of spring and yield. The projecting ends of the tongues 23 and 24 also serve to impart a spring to the jaws, tending to move them into closed position, when they are flexed into open position, these tongues spreading slightly apart as clearly appears in Fig. 3.

It is believed obvious that the jaws may be readily removed and replaced without requiring removal or replacing of the shank itself. Consequently, the cable connection to the shank need not be disturbed in order to replace the jaws.

In the modified form illustrated in Fig. 6 the various advantages referred to are retained. A metal loop 29' with the insulating tube 31' is used for springing apart the resilient jaws 39 and 40. A bolt or screw 42 serves to secure the spring 43 in position, this spring corresponding to the spring 33 in Fig. 1. The shank 36 is provided at its rear end, with a socket 37 in which the end of the cable may be secured as shown in Fig. 1 or, by the deposit of solder therein, the shank being shown in Fig. 6 as unthreaded and adapted for a soldered connection. The shank is provided, at its forward end with a forwardly projecting tongue 38 into which the bolt 42 may be threaded after being pressed through openings formed in the butt ends of the portion 43 and 40.

In Fig. 7 I have shown these jaws in superimposed engaging position before having tension applied thereto by means of the bolt 42. By threading the bolt 42 into the tongue 38 the head of the bolt will serve to force the butt ends of the jaws into closer relation and such diminishing degree of divergence will place the free ends of the jaws under tension. In Fig. 6 these jaws are illustrated as being placed under tension while there is still a degree of adjustment remaining so that further tension may be obtained if desired. As shown in Fig. 6 the divergence space 41 is closed at the butt ends but opens before passing the bolt 42. The ends of the jaws engage against the face of the shank 36 and this face again serves as a means for preventing disalignment of the jaws when placed in registering position. It is believed obvious that the jaws may also be removed from the shank in Fig. 6 without disturbing the shank or the electric conductor thereto.

It will be noted that the tubular handle extends forwardly along the tongues or tongue a sufficient distance for covering or enclosing the clamping or securing member. This protects the member against accidental arcing so that it is prevented from being welded to the tongues and also protects the member against flying slag or weld, thus maintaining the securing and clamping member in condition for operation at all times.

What I claim as new is:

1. In an electrode holder of the class described, a shank-forming portion adapted for attachment to an electric conductor; a pair of spaced tongues projecting outwardly from said shank-forming portion and springable relatively to each other; a pair of clamping jaws in superimposed relation and diverging from each other at opposite ends, said jaws at one of said ends, at their divergence being inserted between said tongues; and means outwardly of said ends of said jaws for clamping the same between said tongues and reducing the divergence thereof for placing the opposite ends of said jaws under tension.

2. In an electrode holder of the class described, a shank-forming portion adapted for attachment to an electric conductor; a pair of spaced tongues projecting outwardly from said shank-forming portion and springable relatively to each other, the outer face of one of said tongues being cut away for accommodating a bolt head and provided with a bolt-receiving opening formed therethrough, the other of said tongues having a registering threaded opening formed therein; a pair of bow shaped clamping jaws positioned in superimposed registering relation and diverging at their opposite ends, one of the ends of said jaws, at the divergence thereof, being inserted between said tongues; and a bolt projected through said opening and through said jaws and threaded into said threaded opening for moving said tongues toward each other into clamping relation with the ends of said jaws for reducing the divergence thereof at said ends.

3. In an electrode holder of the class described, a shank-forming portion adapted for attachment to an electric conductor; a pair of spaced tongues projecting outwardly from said shank-forming portion in registering relation and springable relatively to each other; a pair of bow shaped jaws in superimposed registering relation diverging from each other at their opposite ends, one of the ends of said jaws, at their divergence, being inserted between said tongues; and threaded means for springing said tongues toward each other and moving the same into clamping relation with said ends of said jaws for securing said jaws in position and adjusting the divergence thereof.

4. In an electrode holder of the class described, a shank-forming portion, one end of said shank-forming portion being slotted to provide a pair of spaced apart registering tongues springable relatively to each other; a pair of clamping jaws in superimposed registering relation inserted at one of their ends, at the divergence thereof, in said slot and engaging one of their end faces with the bottom of said slot and diverging at opposite ends; and means projected through said tongues and said jaws for springing said tongues toward each other into clamping relation with the inserted ends of said jaws for securing said jaws thereon and reducing the divergence thereof.

5. In an electrode holder of the class described, a shank-forming portion adapted for attachment to an electric conductor; a supporting tongue extending outwardly from said shank-forming portion; a pair of jaws in superimposed registering relation diverging from each other at their opposite ends, said jaws being mounted on said tongue with the end faces thereof in engagement with an end face of said shank-forming portion; and means projected through said tongue and said jaws for securing said jaws on said tongue and clamping the same relatively to each other for reducing the divergence thereof.

6. In an electrode holder of the class described, a shank-forming portion adapted for attachment to an electric conductor; a supporting tongue extending outwardly from said shank-forming portion; a pair of jaws in superimposed registering relation diverging from each other at their opposite ends and having formed inwardly from one of their ends, registering openings; and means projected through said openings and through said tongue for securing said jaws on said tongue and clamping the same relatively to each other and adjusting the divergence thereof, said tongue terminating on said jaws outwardly of said openings.

7. In an electrode holder of the class described, a shank-forming portion adapted for attachment to an electric conductor; a pair of spaced tongues projecting outwardly from said shank-forming portion and springable relatively to each other, said tongues having registering openings formed therein; a pair of bow-shaped clamping jaws in superimposed registering relation and diverging at their opposite ends and provided, adjacent one of their ends, with registering openings, the opening-bearing end of said jaws, at their divergence, being inserted between said tongues, said tongues terminating outwardly of the openings in said jaws, the openings in said jaws registering with the openings in said tongues; and means projected through said openings for springing said tongues toward each other and moving the same into clamping relation with said ends of said jaws for securing said jaws in position and adjusting the divergence thereof, said tongues being in engagement with said jaws outwardly of said openings.

8. In an electrode holder of the class described, a shank-forming portion adapted for attachment to an electric conductor; a supporting tongue extending outwardly from said shank-forming portion; a pair of jaws in superimposed registering relation diverging from each other at the opposite ends, said jaws being mounted on said tongue adjacent one of their ends at the divergence thereof; means projected through said tongue and said jaws for securing said jaws on said tongue and clamping the same relatively to each other for reducing the divergence thereof, a portion of said jaws engaging a portion of said shank-forming portion for resisting pivotal movement of said jaws on said securing means.

9. In an electrode holder of the class described, a shank-forming portion adapted for attachment to an electric conductor; a pair of spaced tongues projecting outwardly from said shank-forming portion and springable relatively to each other; a pair of clamping jaws in superimposed relation and diverging from each other at opposite ends, said jaws at one of said ends, at their divergence, being inserted between said tongues; means outwardly of said ends of said jaws for clamping the same between said tongues and reducing the divergence thereof for placing the opposite ends of said jaws under tension; and a tubular handle embracing said shank-forming portion and extending forwardly on said tongues beyond said clamping means.

10. In an electrode holder of the class described, a shank-forming portion adapted for attachment to an electric conductor; a supporting tongue extending outwardly from said shank-forming portion; a pair of jaws in superimposed, registering relation diverging from each other at their opposite ends and having formed inwardly from one of their ends, registering openings; means projected through said openings and through said tongue for securing said jaws on said tongue and clamping the same relatively to each other and adjusting the divergence thereof, said tongue terminating on said jaws outwardly of said openings; and a tubular handle embracing said shank-forming portion and extending forwardly of said tongues beyond said securing means for enclosing said securing means.

PHILIP BOURQUE